United States Patent
Okazaki

(10) Patent No.: US 9,288,830 B2
(45) Date of Patent: Mar. 15, 2016

(54) ELECTRONIC DEVICE CAPABLE OF COMMUNICATING WITH ANOTHER DEVICE

(71) Applicant: Panasonic Intellectual Property Management Co., Ltd., Osaka (JP)

(72) Inventor: Yoshinori Okazaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/749,103

(22) Filed: Jun. 24, 2015

(65) Prior Publication Data

US 2015/0296554 A1    Oct. 15, 2015

Related U.S. Application Data

(63) Continuation of application No. PCT/JP2013/007613, filed on Dec. 26, 2013.

(30) Foreign Application Priority Data

Dec. 27, 2012    (JP) .................................. 2012-284200

(51) Int. Cl.
*H04M 1/66*    (2006.01)
*H04M 3/00*    (2006.01)
(Continued)

(52) U.S. Cl.
CPC .......... *H04W 76/023* (2013.01); *H04M 1/7253* (2013.01); *H04W 4/008* (2013.01); *H04W 12/00* (2013.01); *H04W 12/06* (2013.01)

(58) Field of Classification Search
CPC ..... H04W 12/08; H04W 84/12; H04W 12/06; H04W 8/245; H04L 63/08; H04M 1/72525
USPC ............ 455/411, 418–420, 556.1, 556.2, 557
See application file for complete search history.

(56) References Cited

U.S. PATENT DOCUMENTS

2006/0023651 A1    2/2006    Tsuchiuchi et al.
2007/0281735 A1    12/2007    Suzuki
(Continued)

FOREIGN PATENT DOCUMENTS

EP    1 763 266 A1    3/2007
EP    2 242 240 A1    10/2010
(Continued)

OTHER PUBLICATIONS

International Preliminary Report on Patentability for corresponding International Application No. PCT/JP2013/007613 mailed Jul. 9, 2015. English Translation.
(Continued)

*Primary Examiner* — Dung Hong
(74) *Attorney, Agent, or Firm* — Renner, Otto, Boisselle & Sklar, LLP

(57) ABSTRACT

An electronic device comprises a first communicating unit wirelessly communicating with the other electronic device and a controller establishing wireless communication with the other electronic device through the first communicating unit by using setting information. The controller permits the other electronic device to remotely control the operation of the electronic device within a first range if the setting information used for establishing the communication is information not-temporarily issued (for example, a permanent SSID, a permanent PW). The controller permits the other electronic device to remotely control the operation of the electronic device within a second range limited as compared to the first range if the setting information used for establishing the communication is information temporarily issued (for example, a temporary SSID, a temporary PW).

9 Claims, 12 Drawing Sheets

(51) Int. Cl.
*H04M 1/00* (2006.01)
*H04W 76/02* (2009.01)
*H04W 12/00* (2009.01)
*H04M 1/725* (2006.01)
*H04W 4/00* (2009.01)
*H04W 12/06* (2009.01)

(56) References Cited

U.S. PATENT DOCUMENTS

| | | | |
|---|---|---|---|
| 2008/0003995 A1 | 1/2008 | Itaya | |
| 2008/0051073 A1 | 2/2008 | Takahashi et al. | |
| 2009/0007226 A1* | 1/2009 | Fujii | H04L 63/105 726/1 |
| 2011/0115932 A1 | 5/2011 | Shin et al. | |
| 2012/0323717 A1 | 12/2012 | Kirsch | |
| 2013/0120591 A1* | 5/2013 | Bednarczyk | H04W 48/18 348/207.1 |
| 2013/0298194 A1* | 11/2013 | Nakajima | H04W 12/06 726/3 |
| 2014/0022980 A1* | 1/2014 | Matsuda | H04W 48/18 370/315 |
| 2014/0028435 A1* | 1/2014 | Brockway, III | H04N 1/00315 340/3.1 |

FOREIGN PATENT DOCUMENTS

| | | |
|---|---|---|
| JP | 2005-286827 A | 10/2005 |
| JP | 2006-042087 A | 2/2006 |
| JP | 2007-251990 A | 9/2007 |
| JP | 2009-171565 A | 7/2009 |
| JP | 2009-290481 A | 12/2009 |
| JP | 4655040 B | 3/2011 |
| JP | 2011-109657 A | 6/2011 |
| WO | WO 2006/098035 A1 | 9/2006 |

OTHER PUBLICATIONS

International Search Report for corresponding International Application No. PCT/JP2013/007613 mailed Mar. 18, 2014.
Extended European Search Report dated Dec. 10, 2015 for corresponding European Application No. 13868069.9.

* cited by examiner

Fig. 6

| MANAGEMENT NO. | DEVICE IDENTIFIER | REGISTRATION INFORMATION |
|---|---|---|
| 1 | DEVICE IDENTIFIER A | UNLIMITED |

Fig. 11

| MANAGEMENT NO. | DEVICE IDENTIFIER | REGISTRATION INFORMATION |
|---|---|---|
| 1 | IDENTIFIER A | UNLIMITED CONNECTION |
| 2 | IDENTIFIER B | LIMITED CONNECTION |

ELECTRONIC DEVICE CAPABLE OF COMMUNICATING WITH ANOTHER DEVICE

CROSS-REFERENCE TO RELATED APPLICATION

This is a continuation application of International Application No. PCT/JP2013/007613, with an international filing date of Dec. 26, 2013, which claims priority of Japanese Patent Application No.: 2012-284200 filed on Dec. 27, 2012, the content of which is incorporated herein by reference.

BACKGROUND

1. Technical Field

The present disclosure relates to an electronic device capable of communicating with another device.

2. Related Art

Japanese Laid-Open Patent Publication No. 2009-290481 discloses a technique of releasing a lock function of a master terminal only when recognized fingerprint information matches registered fingerprint recognition information.

This leads to suppression of improper act by an unauthorized operator.

The technique disclosed in Japanese Laid-Open Patent Publication No. 2009-290481 has a problem that since a lock function is not released for an unregistered device, communication cannot easily be performed when it is desired to communicate with an unregistered device.

SUMMARY

It is an object of the present disclosure to provide an electronic device capable of easily performing communication while giving consideration to security.

An electronic device of the present disclosure is an electronic device capable of communicating with another electronic device and capable of permitting remote control from the other electronic device. The electronic device includes a first communicating unit configured to wirelessly communicate with the other electronic device and a controller configured to establish wireless communication with the other electronic device through the first communicating unit by using setting information. When the setting information used for establishing the communication is information not-temporarily issued, the controller permits the other electronic device to remotely control the operation of the electronic device within a first range. When the setting information used for establishing the communication is information temporarily issued, the controller permits the other electronic device to remotely control the operation of the electronic device within a second range limited as compared to the first range.

A method of communication of the present disclosure is a method of communication between devices for enabling remote control of one electronic device from another electronic device. The method of communication includes establishing wireless communication between the one electronic device and the other electronic device by using setting information and controlling whether remote control of the one electronic device from the other electronic device is available based on the setting information used for establishing the communication. The controlling whether the remote control is available includes permitting the other electronic device to remotely control the operation of the one electronic device within a first range when the setting information used for establishing the communication is information not-temporarily issued, and permitting the other electronic device to remotely control the operation of the one electronic device within a second range limited as compared to the first range when the setting information used for establishing the communication is information temporarily issued.

The present disclosure can provide the electronic device capable of easily performing communication while giving consideration to security.

BRIEF DESCRIPTION OF DRAWINGS

FIG. 6 is an image diagram of a management table according to the first embodiment;

FIG. 11 is an image diagram of a management table according to the second embodiment.

DETAILED DESCRIPTION OF EMBODIMENTS

Embodiments will now be described in detail with reference to the drawings as needed. It is noted that detailed description will not be provided more than necessary in some cases. For example, detailed description of already well-known facts and repeated description of substantially the same constituent elements may not be provided. This is for the purpose of avoiding unnecessary redundancy of the following description and facilitating understanding by those skilled in the art. The inventors) provides the accompanying drawings and the following description for sufficient understanding of the present disclosure by those skilled in the art and it is not intended to limit the subject matter described in the claims thereto.

First Embodiment

A digital camera 100 and a smartphone 200 will hereinafter be described in terms of configurations and operations in this embodiment.

1-1. Configurations

A configuration of a system according to the present invention and the configurations of the digital camera 100 and the smartphone 200 will hereinafter be described with reference to the figures.

1-1-1. Configuration of System According to the Present Invention

Figure 1:
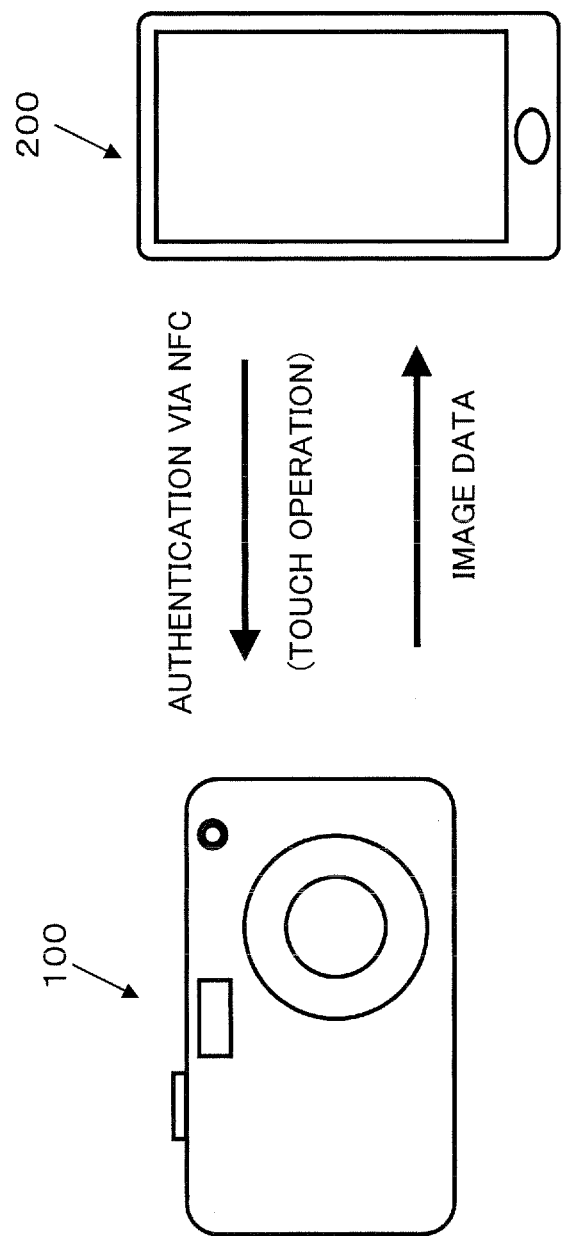
FIG. 1 is a system configuration diagram of a digital camera 100 and a smartphone 200.

FIG. 1 is a diagram of a system configuration made up of the digital camera 100 and the smartphone 200. As depicted in FIG. 1, the digital camera 100 according to the first embodiment can share image data with the smartphone 200 through an authentication operation via NEC (near field communication). The smartphone 200 can transmit instructions for (remotely control) a zoom operation, release button depression, etc. of the digital camera 100 through a communicating unit 254. The digital camera 100 receives an instruction from the smartphone 200 with a communicating unit 171 and performs an operation in accordance with the received instruction. In this case, the digital camera 100 switches permission and rejection of response to the instruction from the smartphone 200 depending on whether the smartphone 200 defined as an image transfer destination is registered in registration information.

As a result, communication can easily be performed with consideration given to security.

The configurations and operations of the digital camera 100 and the smartphone 200 will hereinafter be described.

1-1-2. Configuration of Digital Camera 100

Figure 2:
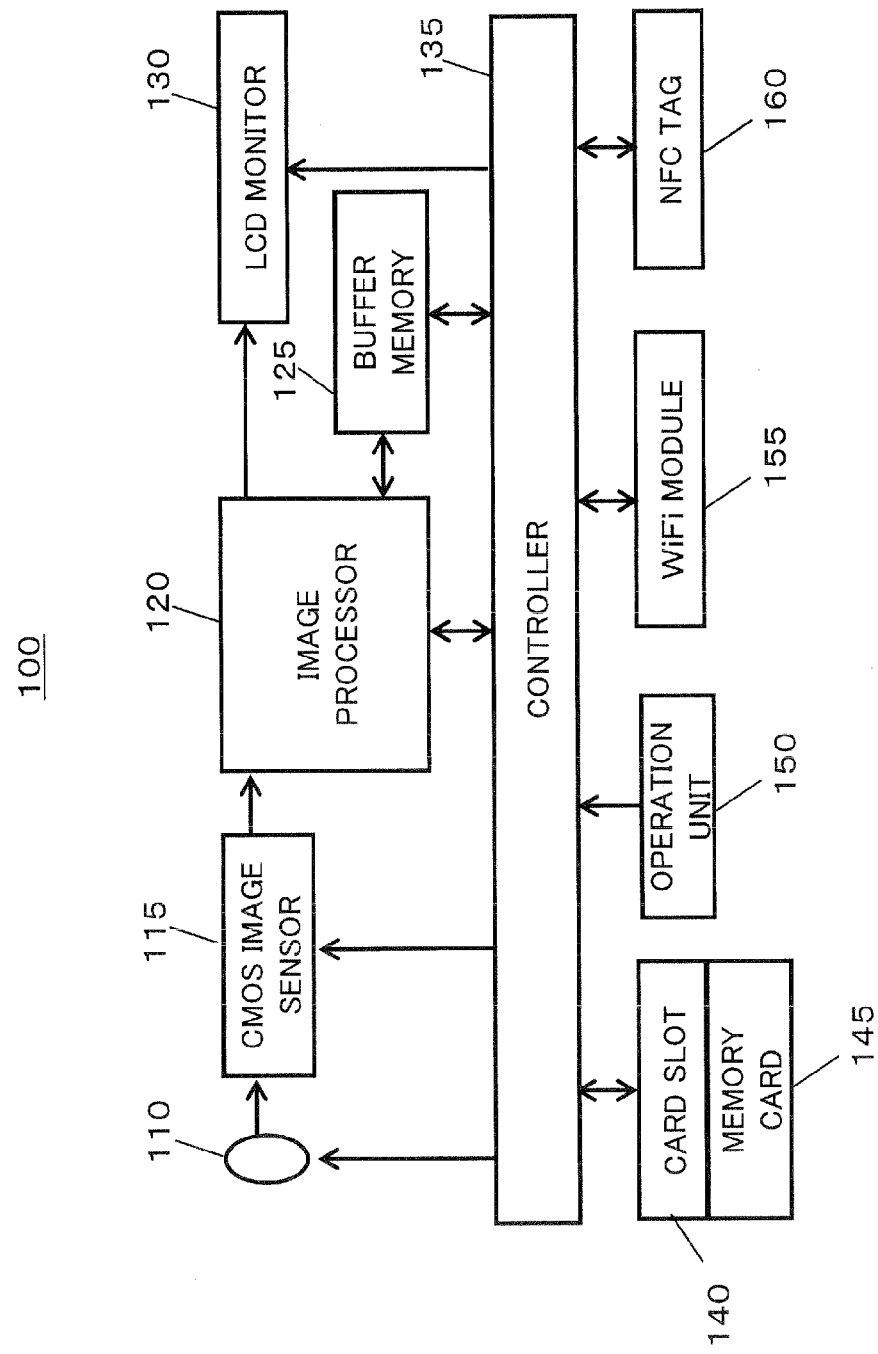
FIG. 2 is an electric configuration diagram of the digital camera 100.

FIG. 2 is an electric configuration diagram of the digital camera 100. The digital camera 100 uses a CMOS image sensor 115 to capture a subject image formed through an optical system 110. The CMOS image sensor 115 generates imaging data (RAW data) based on the captured subject image. An image processor 120 applies various processes to the imaging data generated by capturing the image, thereby generating image data. A controller 135 records the image data generated by the image processor 120 into a memory card 145 inserted in to a card slot 140. The controller 135 can accept an operation on an operation unit 150 by a user to display (reproduce) the image data recorded in the memory card 145 on a liquid crystal monitor 130.

The optical system 110 includes a focus lens, a zoom lens, an optical image stabilization lens (OIS), a diaphragm, a shutter, etc. The various lenses included in the optical system 110 may be made up of any number of lenses or any number of groups.

The CMOS image sensor 115 captures a subject image formed through the optical system 110 to generate the imaging data. The CMOS image sensor 115 generates an image data for a new frame at a predetermined frame rate (e.g., 30 frames/second). The timing of generation of the imaging data and an electronic shutter operation are controlled by the controller 135. An imaging element is not limited to a CMOS image sensor, and other image sensors such as a CCD image sensor and an NMOS image sensor may be used.

The image processor 120 applies various processes to the imaging data output from the CMOS image sensor 115, thereby generating image data. The image processor 120 applies various processes to the image data read from the memory card 145, thereby generating an image to be displayed on the liquid crystal monitor 130. The various processes include, but not limited to, white balance correction, gamma correction, a YC conversion process, an electronic zoom process, a compression process, a decompression process, and the like. The image processor 120 may be made up of a hard-wired electronic circuit or may be made up of a microcomputer etc. using a program.

The liquid crystal monitor 130 is disposed on a back surface of the digital camera 100. The liquid crystal monitor 130 displays an image based on the image data processed by the image processor 120. A display apparatus is not limited to a liquid crystal monitor, and other monitors such as an organic EL monitor may be used.

The controller 135 generally controls the overall operation of the digital camera 100. The controller 135 may be made up of a hard-wired electronic circuit or may be made up of a microcomputer etc. The controller 135 and the image processor 120 or the like may be integrated into a single semiconductor chip. Although not shown, the controller 135 has a ROM therein. The ROM stores an SSTID (Service Set Identifier) and a WEP key (Wired Equivalent Privacy key) necessary for establishing WiFi communication with another communication device. The controller 135 can read the SSID and the WEP key from the ROM as needed. The ROM also stores programs related to autofocus control (AF control) and communication control as well as a program for generally controlling the overall operation of the digital camera 100.

A buffer memory 125 is a storage medium acting as a work memory for the image processor 120 and the controller 135. The buffer memory 125 is achieved by a DRAM (Dynamic Random Access Memory).

The card slot 140 is a connecting means which the memory card 145 can be attached to and detached from. The card slot 140 can electrically and mechanically connected to the memory card 145. The memory card 145 is an external memory including a memory device such as a flash memory therein. The memory card 145 can store data such as image data generated by the image processor 120.

The operation unit 150 is a collective name for hard keys such as operation buttons and operation levers disposed on the exterior of the digital camera 100 and receives an operation by a user. When receiving an operation by a user, the operation unit 150 notifies the controller 135 of various operation instruction signals.

A WiFi module 155 is a communication module performing communication conforming to the communication standard IEEE 802.11. The digital camera 100 can communicate through the WiFi module 155 with another communication device equipped with a WiFi module. The digital camera 100 may communicate through the WiFi module 155 with another communication device directly or via an access point. The WiFi module may be replaced with a communication module performing communication conforming to the communication standard 802.15.1, i.e., Bluetooth (registered trademark). In particular, the communication module may be a communication module which is capable of communication at a relatively high communication bit rate and has a communication area of several meters or more.

An NFC tag 160 is a communication tag performing communication conforming to an NFC standard. The digital camera 100 communicates through the NFC tag 160 with another communication device equipped with an NFC reader/writer to read and write data from/to the NFC reader/writer. The NFC tag 160 includes an antenna, a memory, and a logic circuit. The antenna of the NFC tag 160 transmits and receives signals conforming to the NFC standard. The memory of the NFC tag 160 stores information to be read by the NFC reader/writer. Information is written to the memory of the NFC tag 160, by the NFC reader/writer. The logic circuit of the NFC tag 160 demodulates and transmits a signal received by the antenna to the controller 135 and modulates a signal transmitted from the controller 135 or the memory of the NFC tag 160. Even while no electric power is supplied from the inside of the digital camera 100, the NFC tag 160 can operate with electric power supplied through electromagnetic induction from an NFC reader/writer adjacent to the NFC tag 160.

The communication area of communication conforming to the NFC standard is about several centimeters. For communication through the NFC tag 160, a user of the digital camera 100 must bring the digital camera 100 close to another communication device equipped with an NFC reader/writer such that the other communication device comes within a distance of several centimeters from the digital camera 100. The NFC tag 160 may be replaced with a communicating means performing another near field type wireless communication.

1-1-3. Configuration of Smartphone 200

Figure 3:
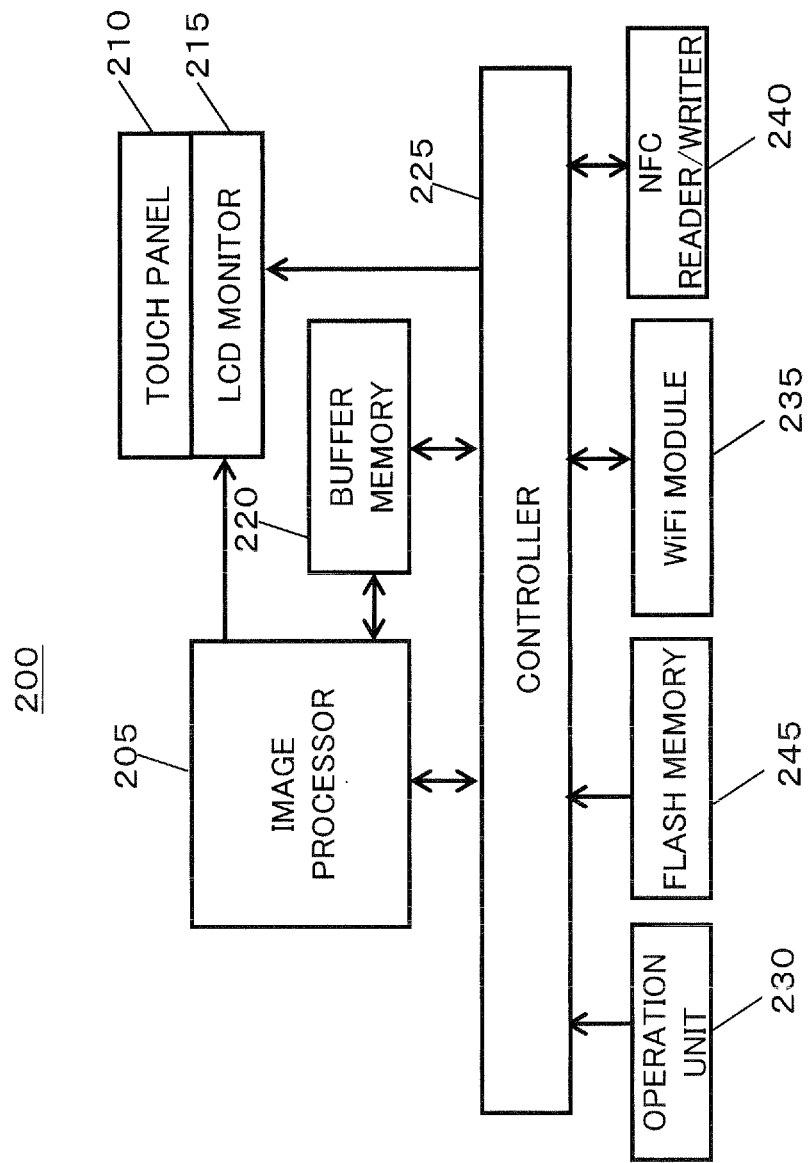
FIG. 3 is an electric configuration diagram of the smartphone 200.

FIG. 3 is an electric configuration diagram of the smartphone 200. The smartphone 200 can display on a liquid crystal monitor 215 an image represented by image data generated by an image processor 205. A touch panel 210 is disposed on a surface of the liquid crystal monitor 215 so that a touch operation by a user can be received. The smartphone 200 has an operation unit 230 which allows an operation other than the operation through the touch panel 210. A controller 225 can communicate through a WiFi module 235 and an NFC reader/writer 240 with another communication device.

The image processor 205 applies various processes to image data read from the memory card 145, thereby generating an image to be displayed on the liquid crystal monitor 215. The various processes include, but not limited to, a decompression process, and the like. The image processor 205 may be made up of a hard-wired electronic circuit or may be made up of a microcomputer, or the like using a program.

The touch panel 210 is an input device detecting contact of a user's finger, or the like to output operation information to the controller 225. The touch panel 210 is disposed on the surface of the liquid crystal monitor 215. The touch panel 210 may be configured by a resistance film system, a capacitance system, or any other system.

The liquid crystal monitor 215 is a display device displaying a screen instructed by the controller 225.

A buffer memory 220 is a memory temporarily storing information necessary for the controller 225 performing various processing operations.

The controller 225 controls operations of the units composing the smartphone 200. The controller 225 is electrically connected to the image processor 205, the touch panel 210, the liquid crystal monitor 215, the buffer memory 220, the operation unit 230, the WiFi module 235, and the NFC reader/writer 240.

The WiFi module 235 is a communication module performing communication conforming to the communication standard IEEE 802.11. The smartphone 200 can communicate through the WiFi module 235 with another communication device equipped with a WiFi module. The smartphone 200 may communicate through the WiFi module 235 with another communication device directly or via an access point. The WiFi module may be replaced with a communication module performing communication conforming to the communication standard 802.15.1, i.e., Bluetooth (registered trademark). In particular, the communication module may be a communication module which is capable of communication at a relatively high communication bit rate and has a communication area of several meters or more.

The NFC reader/writer 240 is a communication reader performing communication conforming to an NFC standard. The smartphone 200 can communicate through the NFC reader/writer 240 with another communication device equipped with an NFC reader/writer or another communication device equipped with an NFC tag to read and write data of the NFC tag. The NFC reader/writer 240 includes an antenna, a memory, and a logic circuit. The antenna of the NFC reader/writer 240 transmits and receives signals conforming to the NFC standard. The memory of the NFC reader/writer 240 stores information to be written to the NFC tag. The memory of the NFC reader/writer 240 stores information read from the NFC tag. The logic circuit of the NFC reader/writer 240 demodulates and transmits a signal received by the antenna to the controller 225 and modulates a signal transmitted from the controller 225 or the memory of the NFC reader/writer 240. Even while an adjacent NFC tag is not supplied with electric power, the NFC reader/writer 240 can supply electric power to the adjacent NFC tag by electromagnetic induction to write or read information. The NFC reader/writer may be replaced with a communicating means performing another near field type wireless communication.

A flash memory 245 stores image data captured by the smartphone 200, image data transferred from the digital camera 100, etc.

The smartphone 200 may have a telephone function, an internet communication function, and a camera function.

1-2. Operation

The operations of the digital camera 100 and the smartphone 200 according to the first embodiment will be described. It is noted that a "touch operation" refers to an operation of a user bringing the NFC tag 160 of the digital camera 100 and the NFC reader/writer 240 of the smartphone 200 close to each other within a communication distance range of the communication conforming to the NFC standard. In this embodiment, the touch operation may be performed by bringing the NFC reader/writer 240 of the smartphone 200 close to the NFC tag 160 of the digital camera 100 or by bringing the NFC tag 160 of the digital camera 100 close to the NFC reader/writer 240 of the smartphone 200.

Figure 4B:
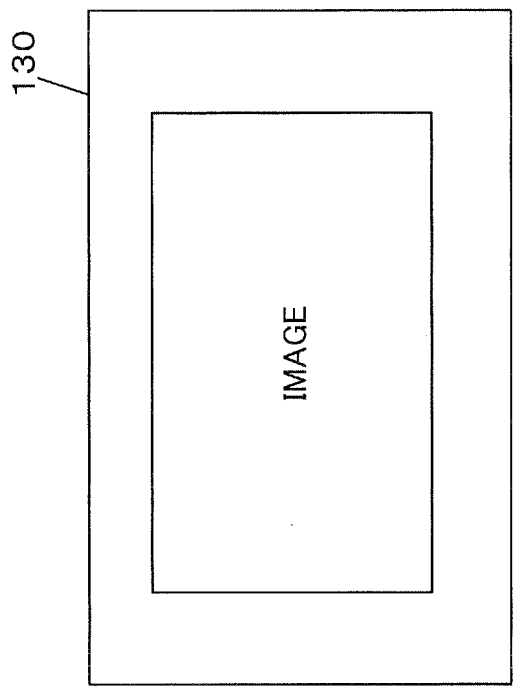
FIGS. 4A and 4B are diagrams for explaining a multiple image playback mode and a single image playback mode.
Figure 4A:
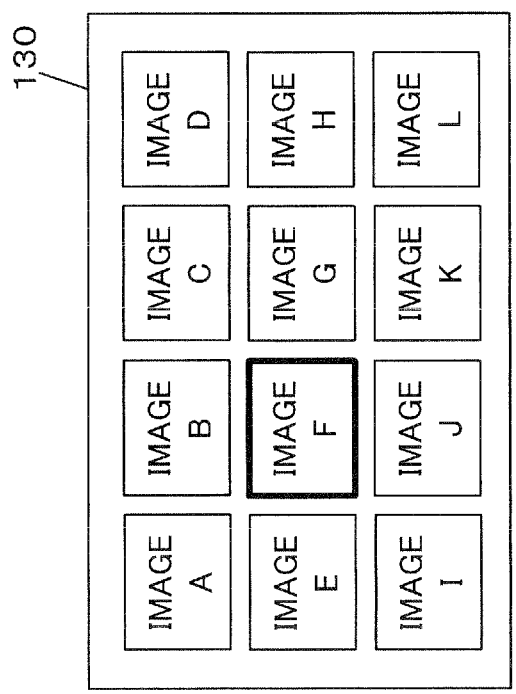

The digital camera 100 has reproduction modes including a multiple image playback mode and a single image playback mode. The multiple image playback mode is a mode of displaying a plurality of reproduced images recorded in the memory card 145 on the liquid crystal monitor 130 of the digital camera 100 as depicted in FIG. 4A. The single image playback mode is a mode of displaying only one reproduced image on the liquid crystal monitor 130 of the digital camera 100 as depicted in FIG. 4B.

The smartphone 200 has a function of remotely controlling the digital camera 100 while being WiFi-connected to the digital camera 100. In the following description, "unlimited connection" is defined as communication connection permitting the control of all the functions related to the digital camera 100 via WiFi. "Limited connection" is defined as communication connection permitting the control of only a portion of the functions (e.g., browsing in the single image playback mode) related to the digital camera 100 via WiFi. "Rejected connection" is defined as connection not permitting any remote control via WiFi.

The WiFi connection between the digital camera 100 and the smartphone 200 is achieved by using WiFi setting information (such as an SSID and a PW (password)). The WiFi setting information includes an SSID and a password (hereinafter referred to as "PW"). In the present disclosure, the WiFi setting information (such as an SSID and a PW (password)) used for the "unlimited connection" is defined as "permanent WiFi setting information" (a permanent SSID, a permanent PW). The WiFi setting information used for the "limited connection" is defined as "temporary WiFi setting information" (a temporary SSID, a temporary PW). The permanent WiFi setting information (the permanent SSID, the permanent PW) is information permanently used after the information is once issued from the digital camera 100. The temporary WiFi setting information (the temporary SSID, the temporary PW) is temporary information invalidated when a certain time elapses after the information is once issued from the digital camera 100.

In the multiple image playback mode, a plurality of images is displayed on the liquid crystal monitor 130 of the digital camera 100 and may include images that the user of the digital camera 100 does not want other users to browse. On the other hand, in the single image playback mode, the user of the digital camera 100 can select and display an intended image. Therefore, in the present disclosure, only a device registered in the "unlimited connection" can WiFi-connect to the digital camera 100 during the multiple image playback mode. On the other hand, in a mode other than the multiple image playback mode (e.g., the single image playback mode), an electronic device not in the "rejected connection", i.e., an electronic device registered or handled in the "unlimited connection" or "limited connection" can WiFi-connect to the digital camera 100.

In the following description, the smartphone 200 registered in the digital camera 100 is described as a "smartphone 200A" and the smartphone 200 not registered in the digital camera 100 is described as a "smartphone 200B". Additionally, "A" is added to the end of reference numeral of the constituent elements making up the smartphone 200A and "B" is added to the end of reference numeral of the constituent elements making up the smartphone 200B in the description.

1-2-1. Operation During Multiple Image Playback Mode

Figure 5:
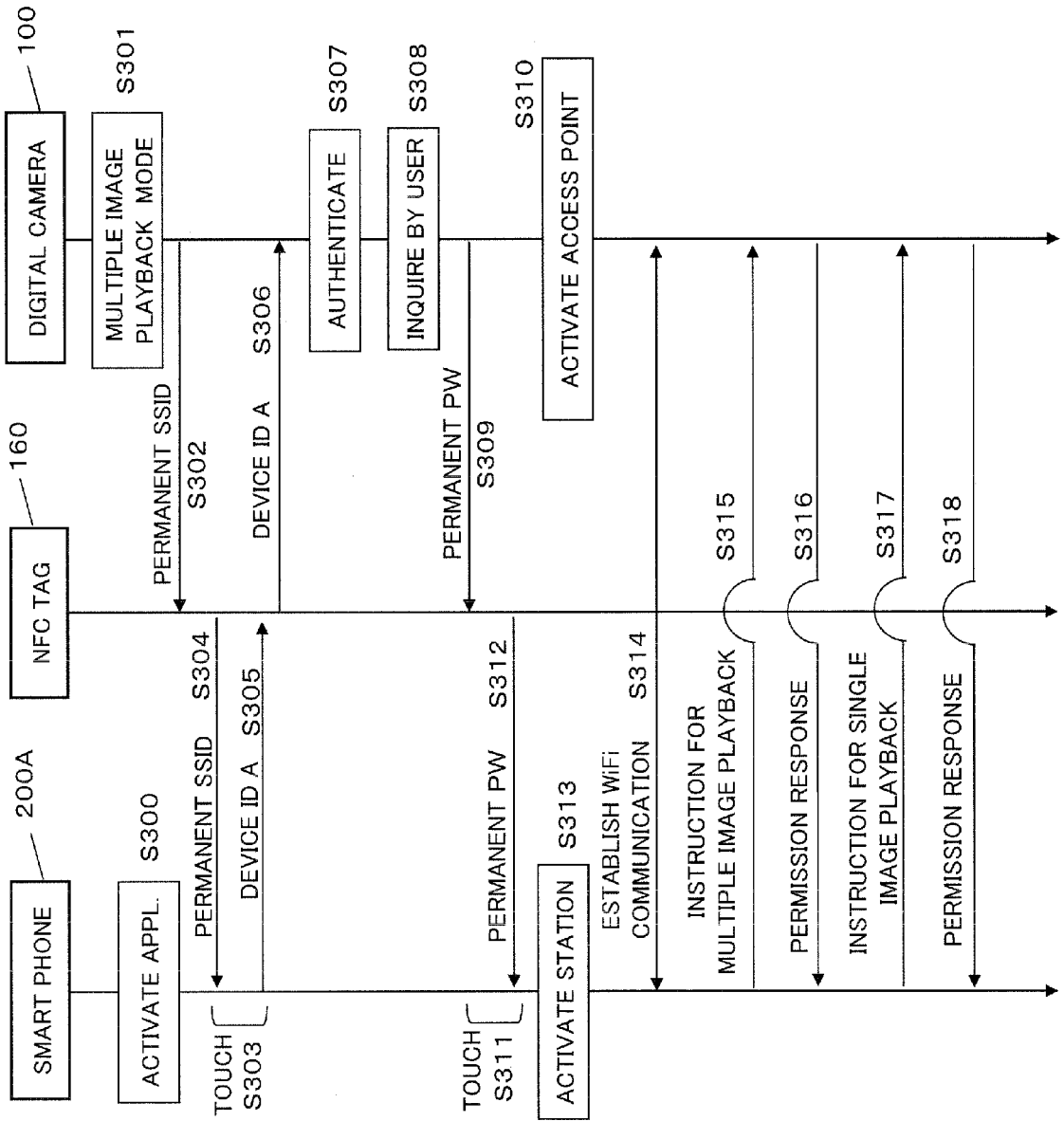
FIG. 5 is a flowchart of a communication operation during the multiple image playback mode according to a first embodiment.

A communication operation between the digital camera 100 and the smartphone 200 in the multiple image playback mode will be described with reference to FIG. 5. FIG. 5 is a flowchart of the communication operation during the multiple image playback mode according to the first embodiment.

First, a user of the smartphone 200A operates the touch panel 210 to activate an application for giving a control instruction to the digital camera 100 (S300). As a result, the smartphone 200A shifts to a mode capable of remote control of the closely located digital camera 100.

On the other hand, the operation mode of the digital camera 100 is selected and set in the digital camera 100 in accordance with the operation on the operation unit 150 by a user. In the example depicted in FIG. 5, the digital camera 100 is set to the multiple image playback mode by the user (S301). In the multiple image playback mode, a plurality of images recorded in the memory card 145 attached to the digital camera 100 is displayed on the screen of the liquid crystal monitor 130. The user can browse the screen of the liquid crystal monitor 130 to check a plurality of images recorded in the memory card 145 attached to the digital camera 100 at the same time.

When set to the multiple image playback mode, the controller 135 of the digital camera 100 writes the permanent SSID to a memory unit of the NFC tag 160 (S302). The writing of the permanent SSID to the NFC tag 160 is not limited to the time of setting to the multiple image playback mode. The permanent SSID may be written to the NFC tag 160 in advance at the time of factory shipment or may be written by the controller 135 at the first power-on.

Subsequently, when the smartphone 200A is made to touch the digital camera 100 (S303), the controller 225A of the smartphone 200A reads the permanent SSID from the NFC tag 160 of the digital camera 100 through the NFC reader/writer 240A (S304). The touch operation causes the controller 225A of the smartphone 200A to write a device identifier A that is information uniquely identifying the smartphone 200A, to the NFC tag 160 through the NFC reader/writer 240A (S305).

The controller 135 of the digital camera 100 then reads the device identifier A from the NFC tag 160 (S306). In the above description, the smartphone 200A acquires the permanent SSID before notifying the digital camera 100 of the device identifier A through the touch operation of step S303. However, this is not a limitation of the order of the processes. For example, the smartphone 200A may make a notification of the device identifier A and subsequently acquire the permanent SSID through the touch operation of step S303.

When acquiring the device identifier A, the controller 135 of the digital camera 100 checks whether the device identifier A is registered in a management table stored in the memory of the digital camera 100, thereby authenticating the smartphone 200A (S307). FIG. 6 depicts an example of the management table. As depicted in FIG. 6, the management table manages the correlation between a device identifier and a limitation (no limitation) to a device indicated by the device identifier.

Figure 7:
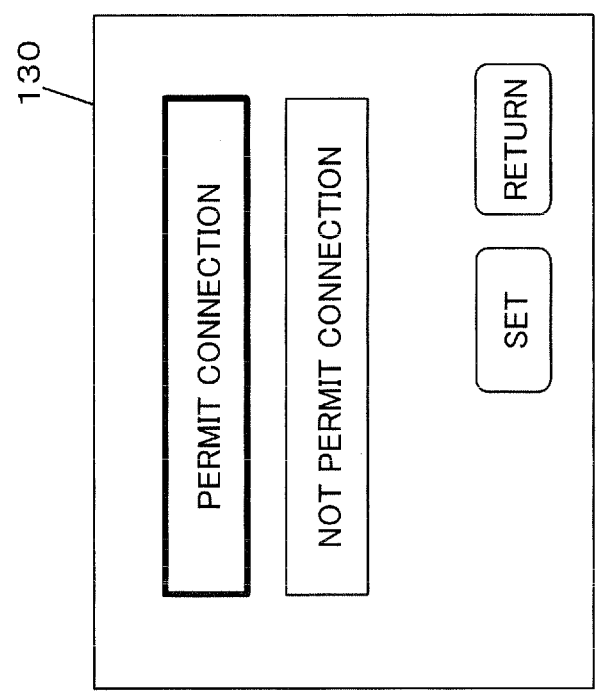
FIG. 7 is a diagram for explaining an inquiry screen to a user.

If the device identifier is not registered in the management table, the controller 135 of the digital camera 100 displays a message screen for inquiring of a user whether connection is permitted, on the liquid crystal monitor 130 (S308) For example, as depicted in FIG. 7, a screen is displayed on the liquid crystal monitor 130 for allowing a user to select either "permit connection" or "not permit connection". In this case, the user operates the operation unit 130 to select either "permit connection" or "not permit connection". The selection of "not permit connection" by the user results in the "rejected connection" and the operation depicted in FIG. 5 is terminated. On the other hand, if "permit connection" is selected, the controller 135 of the digital camera 100 registers the device identifier A in the management table as depicted in FIG. 6. In this description, it is assumed that the user selects "permit connection" for the smartphone 200A.

In this case, the smartphone 200A indicated by the device identifier A is managed as a device registered in the digital camera 100, i.e., a connection-permitted device. In this case, the digital camera 100 is in the multiple image playback mode and the smartphone 200A is therefore registered in the management table as a device connected in the "unlimited connection".

If the device identifier is registered in the management table, the controller 135 of the digital camera 100 handles the smartphone 200A as a device in the "unlimited connection" without displaying the message screen for inquiring of the user.

Since the smartphone 200A is a device in the unlimited connection, the controller 135 of the digital camera 100 writes the permanent PW to the NFC tag 160 (S309). The controller 135 of the digital camera 100 executes software for allowing the digital camera 100 to act as an access point, thereby activating the access point with the permanent SSID and the permanent PW (S310).

The user of the smartphone 200A causes the smartphone 200A to touch the digital camera 100 again (S311). This touch operation enables the NFC reader/writer 240A of the smartphone 200A to read the permanent PW from the NFC tag 160 of the digital camera 100 (S312). The controller 225A of the smartphone 200A executes software for allowing the smartphone 200A to act as a station, thereby activating the station (S313). The controller 225A of the smartphone 200A uses the acquired permanent SSID and permanent PW to establish WiFi communication with the digital camera 100 (S314).

As described above, the smartphone 200A is registered as a device subjected to the "unlimited connection" in the digital camera 100 and establishes WiFi communication. The smartphone 200A and the digital camera 100 subsequently perform WiFi communication.

It is assumed that the user of the smartphone 200A then gives an instruction related to the multiple image playback mode to the digital camera 100. The smartphone 200A transmits the instruction related to the multiple image playback mode (instruction for remote control) to the digital camera 100 in accordance with the user operation (S315).

The multiple image playback mode is a mode in which only a device registered as the "unlimited connection" can connect to (can control) the digital camera 100. The smartphone 200A is a device of the "unlimited connection". Therefore, the controller 135 of the digital camera 100 transmits to the smartphone 200A a permission response to the instruction related to the multiple image playback mode (S316). This enables the smartphone 200A to remotely control the digital camera 100 in relation to the multiple image playback mode.

It is assumed that the user of the smartphone 200A gives an instruction related to an operation mode other than the multiple image playback mode (e.g., the single image playback mode) to the digital camera 100. The smartphone 200A transmits the instruction related to the operation mode other than the multiple image playback mode (e.g., the single image playback mode) to the digital camera 100 (S317).

The operation mode other than the multiple image playback mode (e.g., the single image playback mode) is a mode in which a device registered as the "unlimited connection" or "limited connection" can connect to (can control) the digital camera 100. The smartphone 200A is not in the "rejected connection" in the digital camera 100 and is registered as a device of the "unlimited connection" as depicted in FIG. 6. Therefore, the digital camera 100 gives the smartphone 200A a permission response to the instruction related to the operation mode other than the multiple image playback mode (S318). This enables the smartphone 200A to remotely control the digital camera 100 also in terms of the functions related to the operation mode other than the multiple image playback mode.

As described above, the smartphone 200A can give the remote control instruction to the digital camera 100 under the condition of the "unlimited connection".

1-2-2. Operation During Single Image Playback Mode

Figure 8:
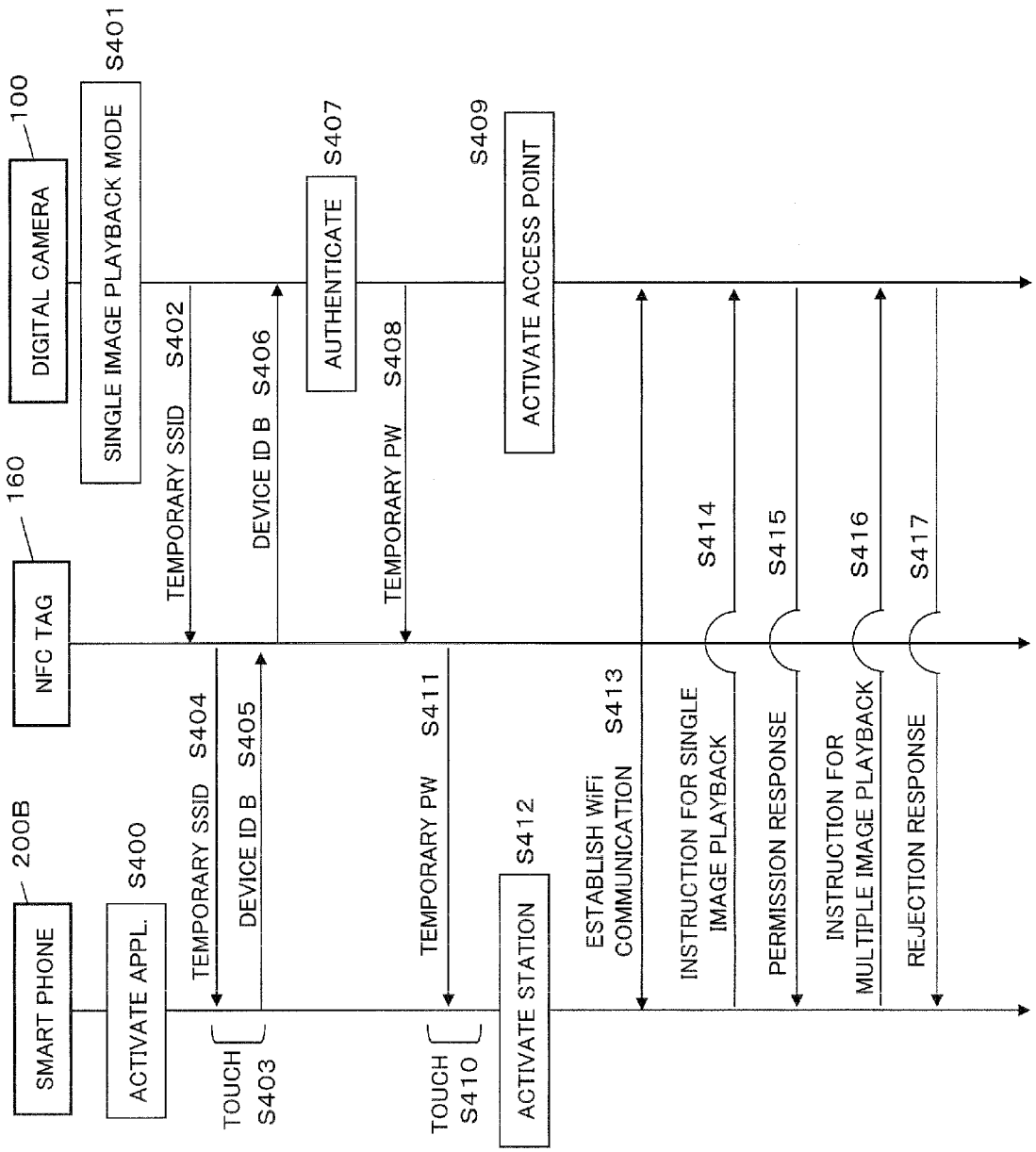
FIG. 8 is a flowchart of a communication operation during the single image playback mode according to the first embodiment.

A communication operation during the single image playback mode between the digital camera 100 and the smartphone 200 will be described with reference to FIG. 8. FIG. 8 is a flowchart of the communication operation during the single image playback mode according to the first embodiment.

First, an application for enabling the remote control of the digital camera 100 is activated in the smartphone 200B in accordance with an operation of the touch panel 210 by a user (S400). As a result, the smartphone 200B shifts to a mode capable of the remote control of the closely located digital camera 100.

On the other hand, the operation mode of the digital camera 100 is selected and set in the digital camera 100 in accordance with the operation on the operation unit 150 by a user. In the example depicted in FIG. 8, the digital camera 100 is set to the single image playback mode by the user (S401). The single image playback mode is a mode in which one of the images recorded in the memory card 145 attached to the digital camera 100 is displayed alone on the screen of the liquid crystal monitor 130. The user can browse the screen of the liquid crystal monitor 130 to check only one single image out of the images recorded in the memory card 145 attached to the digital camera 100. In this case, for example, the user of the digital camera 100 selects only one image allowed to be shared with others, as a reproduction object.

When set to the single image playback mode, the controller 135 of the digital camera 100 writes the temporary SSID to the memory unit of the NFC tag 160 (S402).

Subsequently, when the smartphone 200B is made to touch the digital camera 100 (S403), the controller 225B of the smartphone 200B reads the temporary SSID from the NFC tag 160 of the digital camera 100 through the NFC reader/writer 240B (S404). The touch operation of step S403 causes the controller 225B of the smartphone 200B to write a device identifier B that is information uniquely identifying the smartphone 200B, to the NFC tag 160 through the NFC reader/writer 240B (S405). When the device identifier B is written to the NFC tag 160, the controller 135 of the digital camera 100 reads the device identifier B from the NFC tag 160 (S406). Although the acquisition of the temporary SSID is followed by the process of notification of the device identifier B through the touch operation of step S403 in the above description, this is not a limitation of the order of the processes. In particular, the temporary SSID may be acquired after the notification of the device identifier B through the touch operation of step S403.

When acquiring the device identifier B, the controller 135 of the digital camera 100 checks whether the device identifier B is registered in the management table stored in the memory of the digital camera 100, thereby authenticating the smartphone 200B (S407). In this case, if the smartphone is registered in the management table of the digital camera 100, the "unlimited connection" is permitted. In the following description, it is assumed that the smartphone 200B is not registered in the management table of the digital camera 100.

In the single image playback mode, if the smartphone 200B is not registered in the management table of the digital camera 100, the controller 135 of the digital camera 100 permits the smartphone 200B to connect in the "limited connection" enabling only the control instructions related to the single image playback mode.

For connecting in the "limited connection", the controller 135 of the digital camera 100 writes the temporary PW to the NFC tag 160 (S408). The controller 135 of the digital camera 100 executes the software for allowing the digital camera 100 to act as an access point, thereby activating the access point with the temporary SSID and the temporary PW (S409).

The user of the smartphone 200B causes the smartphone 200B to touch the digital camera 100 again (S410). This touch operation enables the NFC reader/writer 240B of the smartphone 200B to read the temporary PW from the NFC tag 160 of the digital camera 100 (S411). The controller 225B of the smartphone 200B executes the software for allowing the smartphone 200B to act as a station, thereby activating the station (S412). The controller 225B of the smartphone 200B uses the acquired temporary SSID and temporary PW to establish WiFi communication with the digital camera 100 (S413). The smartphone 200B and the digital camera 100 subsequently perform WiFi communication.

As described above, the smartphone 200B establishes WiFi communication with the digital camera 100 while being handled as a device subjected to the "unlimited connection" in the digital camera 100.

It is assumed that the user of the smartphone 200B then gives an instruction related to the single image playback mode to the digital camera 100 (S414). The single image playback mode is a mode in which another device is permitted to connect to the digital camera 100 as long as the device is not in the "rejected connection". Since the smartphone 200B is handled as a device subjected to the "limited connection" in the digital camera 100, the digital camera 100 transmits to the smartphone 200B a permission response to the instruction related to the single image playback mode (S415). This enables the smartphone 200B to remotely control the digital camera 100 in relation to the single image playback mode.

It is assumed that the user of the smartphone 200B gives an instruction related to the multiple image playback mode to the digital camera 100. The multiple image playback mode is a mode in which only a device registered as the "unlimited connection" is connectable. The smartphone 200B is handled as a device subjected to the "limited connection" in the digital camera 100. Therefore, the digital camera 100 transmits to the smartphone 200B a rejection response to the instruction related to the multiple image playback mode (S417). In this way, the smartphone 200B can be limited such that the smartphone 200B cannot remotely control the digital camera 100 in relation to the multiple image playback mode.

As described above, the smartphone 200B can give an operation instruction to the digital camera 100 under the condition of the "limited connection". In particular, if the WiFi connection is established by using the temporary WiFi setting information (the temporary SSID, the temporary PW), the smartphone 200B is permitted to provide the remote control related to the single image playback mode and is rejected in terms of the remote control related to the multiple image playback mode. If the WiFi connection is established by using the temporary WiFi setting information in this way, the range of the remote control from the smartphone 200B is limited as compared to when the WiFi connection is established by using the permanent WiFi setting information.

The temporary WiFi setting information (the temporary SSID, the temporary PW) expires when a predetermined time elapses after the information is once issued from the digital camera 100. Therefore, a device subjected to the "limited connection" can be allowed to make an operation instruction to the digital camera 100 under a certain time restriction.

As described above, the digital camera 100 of the first embodiment is an electronic device capable of communication with the smartphone 200 and capable of permitting the remote control from the smartphone 200. The digital camera 100 includes the WiFi module 155 (an example of a first communicating unit) wirelessly communicating with the smartphone 200 and the controller 135 establishing wireless communication with the smartphone 200 through the WiFi module 155 by using the WIFi setting information. If the WiFi setting information used for establishing the communication is non-temporarily issued information (the permanent SSID, the permanent PW), the controller 135 permits the smartphone 200 to remotely control the operation of the digital camera 100 within a first range (both the multi-reproduction and the single playback) (S315 to S316, S317 to S318). If the setting information used for establishing the communication is temporarily issued information (the temporary SSID, the temporary PW), the controller 135 permits the smartphone 200 to remotely control the operation of the digital camera 100 within a second range limited as compared to the first range (only the instructions related to the single playback) (S414 to S415, S416 to S417).

Second Embodiment

Another embodiment of the communication operation between the digital camera 100 and the smartphone 200 will be described. The configurations of the digital camera 100 and the smartphone 200 according to a second embodiment are the same as the configurations of the digital camera 100 and the smartphone 200 described in the first embodiment and therefore will not be described in detail. Thus, reference numerals of the constituent elements of the digital camera 100 and the smartphone 200 according to the second embodiment are the same as reference numerals of the digital camera 100 and the smartphone 200 according to the first embodiment.

In this embodiment, the digital camera 100 transmits an SSID and a PW (the WiFi setting information) to the smartphone 200 after receiving the device identifier from the smartphone 200 and performing the authentication. If the smartphone is not registered in the management table at the time of authentication in the digital camera 100, the smartphone is registered in the management table in accordance with user selection (unlimited connection/limited connection/rejected connection).

2-1. Communication Operation when Unlimited Connection is Selected

Figure 9:
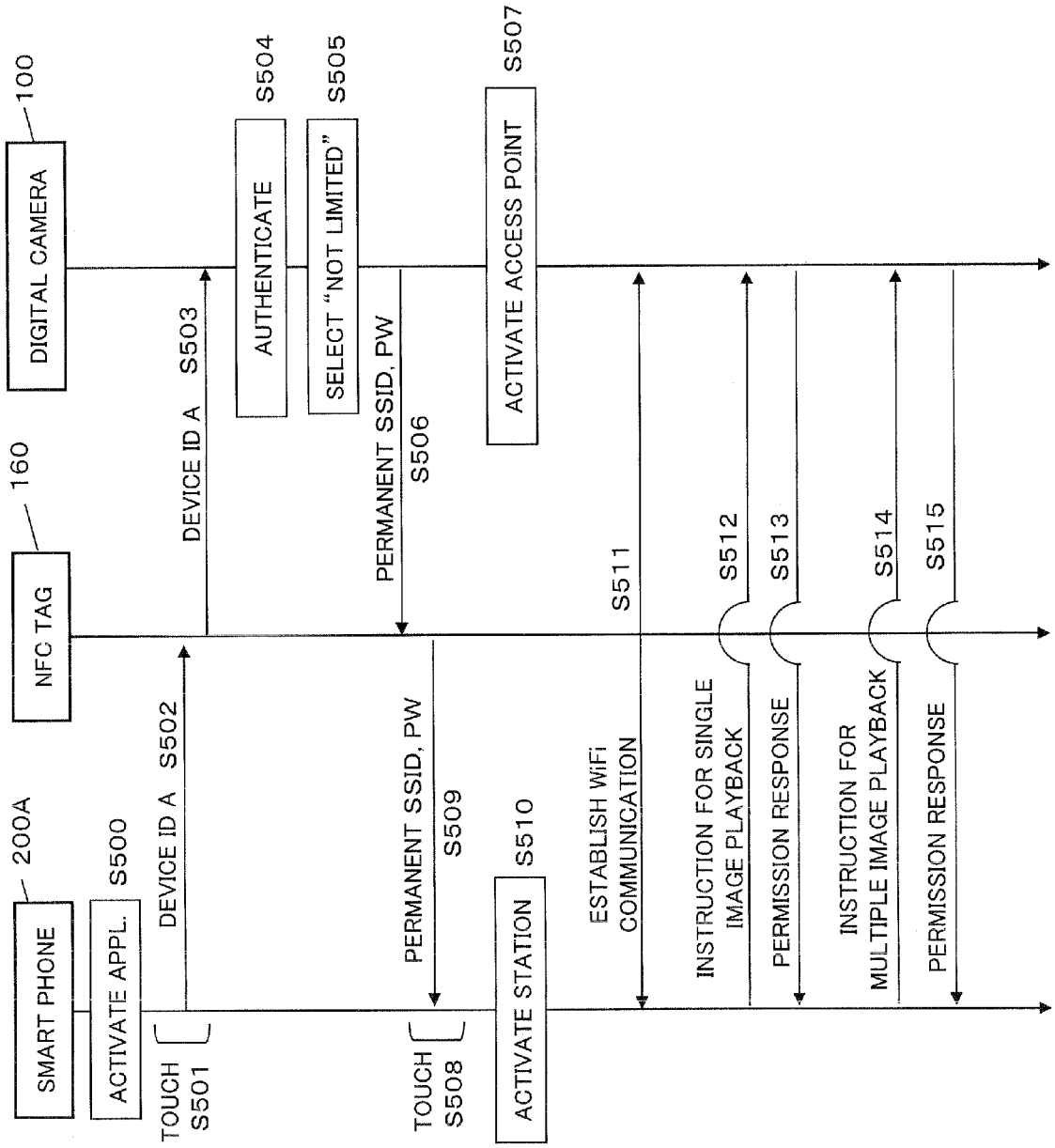
FIG. 9 is a flowchart of a communication operation when unlimited connection is selected according to a second embodiment.

Description will be made of the communication operation between the digital camera 100 and the smartphone 200A when a user selects the unlimited connection according to the second embodiment with reference to FIG. 9. FIG. 9 is a flowchart of the communication operation when the unlimited connection is selected according to the second embodiment.

First, the user of the smartphone 200A operates the touch panel 210 to activate the application for giving a control instruction to the digital camera 100 (S500). As a result, the smartphone 200A shifts to a mode capable of remote control of the closely located digital camera 100.

Subsequently, when the smartphone 200A is made to touch the digital camera 100 (S501), the controller 225A of the smartphone 200A writes the device identifier A uniquely identifying the smartphone 200A to the NFC tag 160 of the digital camera 100 through the NFC reader/writer 240A (S502). When the device identifier A is written to the NFC tag 160, the controller 135 of the digital camera 100 reads the device identifier A from the NFC tag 160 (S503).

Figure 10:
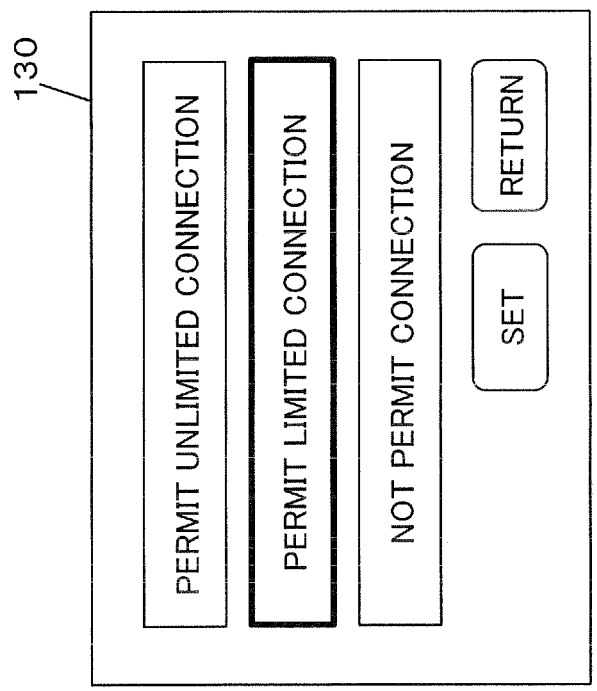
FIG. 10 is a diagram for explaining an inquiry screen to a user.

When acquiring the device identifier A, the controller 135 of the digital camera 100 checks whether the device identifier A is registered in the management table stored in the memory of the digital camera 100, thereby authenticating the smartphone 200A (S504). If the device identifier is not registered in the management table, the controller 135 of the digital camera 100 displays a message screen for inquiring of a user whether connection is permitted, on the liquid crystal monitor 130. For example, as depicted in FIG. 10, a screen is displayed on the liquid crystal monitor 130 for allowing the user to select "permit unlimited connection", "permit limited connection", or "not permit connection".

The user operates the operation unit 130 to select "permit unlimited connection", "permit limited connection", or "not permit connection". The selection of "not permit connection" by the user results in the "rejected connection" and the operation depicted in FIG. 9 is terminated at this step. It is assumed that the user selects "permit unlimited connection" (S505). In this case, the controller 135 of the digital camera 100 registers the device identifier A in the management table as depicted in FIG. 11. The device identifier A is managed as the "unlimited connection" as depicted in FIG. 11. The smartphone 200A indicated by the device identifier A is subsequently managed as a device registered in the digital camera 100. The smartphone 200A registered in the digital camera 100 is comprehended as an object of "unlimited connection". The operation in the case of the selection of "limited connection" by the user will be described in detail later.

The controller 135 of the digital camera 100 then writes the permanent SSID and the permanent PW to the NFC tag 160

(S506). The controller 135 of the digital camera 100 executes the software for allowing the digital camera 100 to act as an access point, thereby activating the access point with the permanent SSID and the permanent PW (S507).

The user of the smartphone 200A causes the smartphone 200A to touch the digital camera 100 again (S508). This touch operation enables the NFC reader/writer 240A of the smartphone 200A to read the permanent SSID and the permanent PW from the NFC tag 160 of the digital camera 100 (S509). The controller 225A of the smartphone 200A executes the software for allowing the smartphone 200A to act as a station, thereby activating the station (S510). The controller 225A of the smartphone 200A uses the acquired permanent SSID and permanent PW to establish WiFi communication with the digital camera 100 (S511). The smartphone 200A and the digital camera 100 subsequently perform WiFi communication.

As described above, the smartphone 200A is registered as a device subjected to the "unlimited connection" in the digital camera 100 and the WiFi communication is established.

It is assumed that the user of the smartphone 200A then gives an instruction related to the single image playback mode to the digital camera 100. The smartphone 200A transmits the instruction related to the single image playback mode (instruction for remote control) to the digital camera 100 in accordance with the user operation (S512).

In this embodiment, the single image playback mode is a mode in which a device registered as the "unlimited connection" or the "limited connection" can provide the remote control Since the smartphone 200A is registered as a device subjected to the "unlimited connection" in the digital camera 100, the digital camera 100 transmits to the smartphone 200A a permission response to the instruction related to the single image playback mode (S513). This enables the smartphone 200A to remotely control the digital camera 100 in relation to the single image playback mode.

It is assumed that the user of the smartphone 200A then gives an instruction related to the multiple image playback mode to the digital camera 100. The smartphone 200A transmits the instruction related to the multiple image playback mode (instruction for remote control) to the digital camera 100 (S514) In this embodiment, the multiple image playback mode is a mode in which only a device registered as the "unlimited connection" can provide the remote control. Since the smartphone 200A is registered as a device subjected to the "unlimited connection" in the digital camera 100, the digital camera 100 transmits to the smartphone 200A a permission response to the instruction related to the multiple image playback mode (S515). Therefore, the smartphone 200A can remotely control the digital camera 100 in relation to the multiple image playback mode.

As described above, the smartphone 200A can remotely control the digital camera 100 under the condition of the "unlimited connection".

2-2. Communication Operation when Limited Connection is Selected

Figure 12:
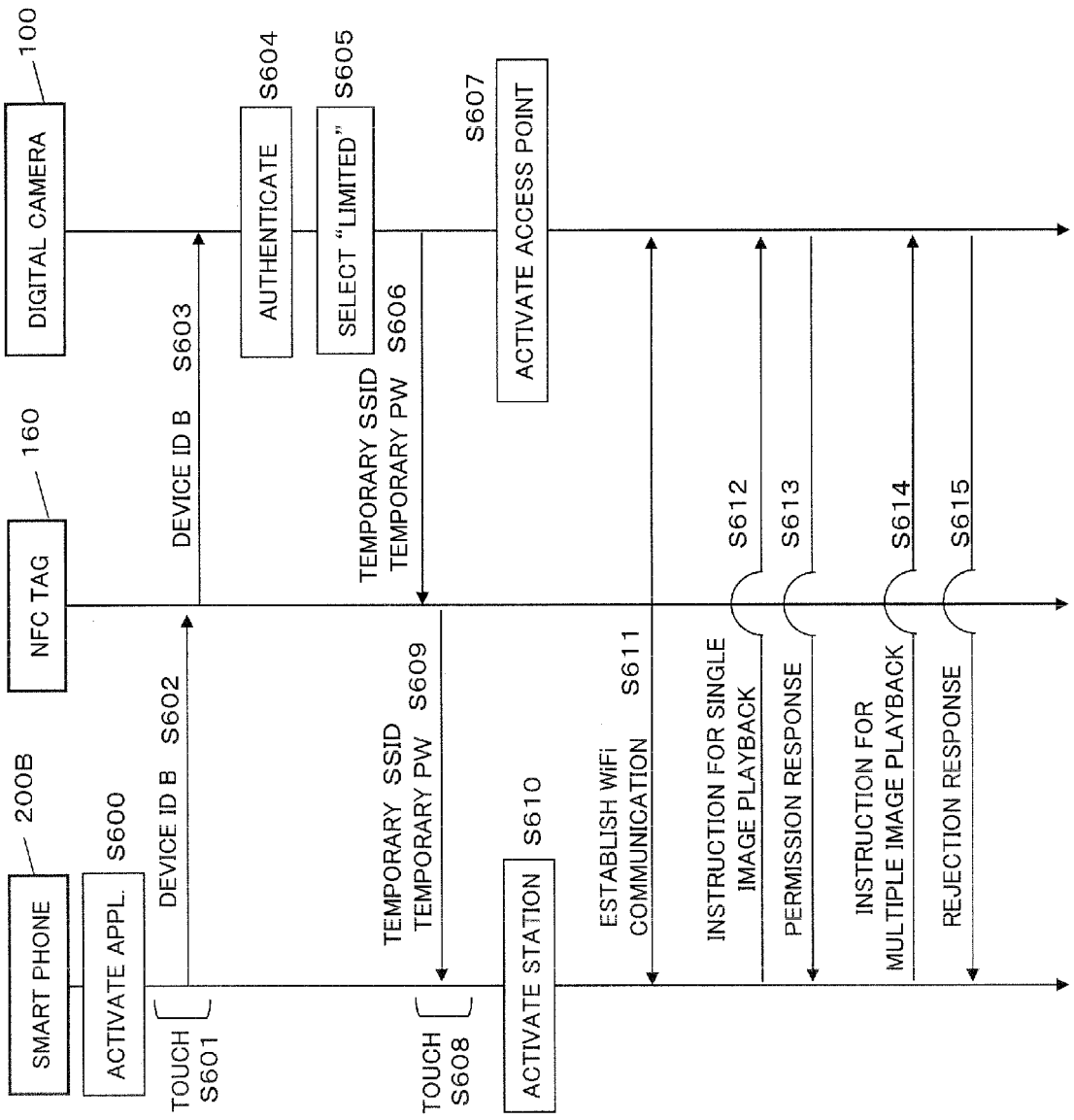
FIG. 12 is a flowchart of a communication operation when limited connection is selected according to the second embodiment.

Description will be made of the communication operation between the digital camera 100 and the smartphone 200A when the limited connection is selected with reference to FIG. 12. FIG. 12 is a flowchart of the communication operation when the limited connection is selected according to the second embodiment.

First, an application for enabling the remote control of the digital camera 100 is activated in the smartphone 200B in accordance with an operation of the touch panel 210 by a user (S600). As a result, the smartphone 200B shifts to a mode capable of the remote control of the closely located digital camera 100.

Subsequently, when the smartphone 200B is made to touch the digital camera 100 (S601), the controller 225B of the smartphone 200B writes the device identifier B uniquely identifying the smartphone 200B to the NFC tag 160 of the digital camera 100 through the NFC reader/writer 240B (S602). When the device identifier B is written to the NFC tag 160, the controller 135 of the digital camera 100 reads the device identifier B from the NFC tag 160 (S603).

When acquiring the device identifier B, the controller 135 of the digital camera 100 checks whether the device identifier B is registered in the management table stored in the memory of the digital camera 100, thereby authenticating the smartphone 200B (S604). If the device identifier is not registered in the management table, the controller 135 of the digital camera 100 displays a message screen for inquiring of a user whether connection is permitted as depicted in FIG. 10 on the liquid crystal monitor 130.

If the user selects "permit limited connection", the controller 135 of the digital camera 100 registers the device identifier B in the management table as depicted in FIG. 11. The device identifier B is managed as the "limited connection" as depicted in FIG. 11. The smartphone 200B indicated by the device identifier B is subsequently managed as a device registered in the digital camera 100. The smartphone 200B registered in the digital camera 100 is managed in the management table as an object of "limited connection".

The controller 135 of the digital camera 100 then writes the temporary SSID and the temporary PW to the NFC tag 160 (S606). The controller 135 of the digital camera 100 executes the software for allowing the digital camera 100 to act as an access point, thereby activating the access point with the temporary SSID and the temporary PW (S607).

The user causes the smartphone 200B to touch the digital camera 100 again (S608). This touch operation enables the NFC reader/writer 240B of the smartphone 200B to read the temporary SSID and the temporary PW from the NFC tag 160 of the digital camera 100 (S609). The controller 225B of the smartphone 200B executes the software for allowing the smartphone 200B to act as a station, thereby activating the station (S610). The controller 225B of the smartphone 200B uses the acquired temporary SSID and temporary PW to establish WiFi communication with the digital camera 100 (S611). The smartphone 200B and the digital camera 100 subsequently perform WiFi communication.

As described above, the smartphone 200B is registered as a device of the "limited connection" in the digital camera 100 and the WiFi communication is established.

It is assumed that the user of the smartphone 200B then gives a remote control instruction related to the single image playback mode to the digital camera 100. The smartphone 200B transmits the instruction related to the single image playback mode to the digital camera 100 (S612). In this embodiment, the single image playback mode is a mode in which a device registered as the "unlimited connection" or the "limited connection" can provide the remote control. The smartphone 200B is registered as a device subjected to the "limited connection" in the digital camera 100. Therefore, the digital camera 100 transmits to the smartphone 200B a permission response to the instruction related to the single image playback mode (S613). This enables the smartphone 200B to remotely control the digital camera 100 in relation to the single image playback mode.

It is assumed that the user of the smartphone 200B then gives an instruction related to the multiple image playback mode to the digital camera 100. The smartphone 200B transmits the instruction related to the multiple image playback mode to the digital camera 100 (S614). However, since the smartphone 200B is registered as a device subjected to the "limited connection" in the digital camera 100, the digital camera 100 transmits to the smartphone 200B a rejection response to the instruction related to the multiple image playback mode (S615). Therefore, the smartphone 200B cannot remotely control the digital camera 100 in relation to the multiple image playback mode.

As described above, the smartphone 200B can give a remote control instruction to the digital camera 100 under the condition of the "limited connection".

The temporary WiFi setting information (the temporary SSID, the temporary PW) expires when a predetermined time elapses after the information is once issued from the digital camera 100. Therefore, a device subjected to the "limited connection" can be allowed to make an operation instruction to the digital camera 100 under a certain time restriction.

Also in this embodiment, if the WiFi setting information used for establishing the communication is non-temporarily issued information (the permanent SSID, the permanent PW), the controller 135 permits the smartphone 200 to remotely control the operation of the digital camera 100 within the first range (both the multi-reproduction and the single playback) (S512 to S513, S514 to S515). If the setting information used for establishing the communication is temporarily issued information (the temporary SSID, the temporary PW), the controller 135 permits the smartphone 200 to remotely control the operation of the digital camera 100 within the second range limited as compared to the first range (only the instructions related to the single playback) (S612 to S613, S614 to S615). As a result, if the WiFi connection is established by using the temporary WiFi setting information, the range of the remote control from the smartphone 200B is limited as compared to when the WiFi connection is established by using the permanent WiFi setting information.

As described above, the digital camera 100 according to the second embodiment can easily perform communication while giving consideration to security.

Other Embodiments

As described above, the first and second embodiments have been described as exemplification of the techniques disclosed in this application. However, the techniques in the present disclosure are not limited thereto and are applicable to embodiments subjected to modification, replacement, addition, and omission as needed. The constituent elements described in the first and second embodiments can be combined to implement a new embodiment. Other embodiments will hereinafter be exemplified.

Although the temporary WiFi setting information (the temporary SSID, the temporary PW) is invalidated when a certain time elapses after the information was once issued from the digital camera 100 in the embodiments, this is not a limitation. For example, the information may be invalidated when a predetermined operation is performed or may be invalidated when browsing of one image is terminated. In short, it is only necessary that the information can be implemented as temporarily issued information.

Although the controller 135 of the digital camera 100 is described in a form of writing the WiFi setting information (the permanent PW, the permanent SSID, the temporary PW, the temporary SSID) to the NFC tag 160 (S309, S408, S506, S606), this is not a limitation. The controller 135 of the digital camera 100 may not write the WiFi setting information in advance to the NFC tag 160 and, when the touch operation (S311, S410, S508, S608) is performed, the controller 135 of the digital camera 100 may directly notify the smartphone 200A of the WiFi setting information through the NFC tag 160. Since the digital camera 100 does not write the permanent PW to the NFC tag 160, a more secure system can be provided.

After the touch operation (S311, S410, S508, S608) of the smartphone 200A is completed, the digital camera 100 in this case may erase the WiFi setting information written to the NFC tag 160 of the digital camera 100. Since the digital camera 100 erases the permanent PW information written to the NFC tag 160, a more secure system can be provided.

If the touch operation (S311, S410, S508, S608) of the smartphone 200A is not performed for a certain time, the digital camera 100 may erase the WiFi setting information written to the NFC tag 160. As a result, a more secure system can be provided.

If no device identifier is registered in the management table at step S308 depicted in FIG. 5 etc., "user inquiry" for connection permission is performed in the embodiments; however, if a device identifier is already registered in the management table, the "user inquiry" may not be performed.

The controller 135 of the digital camera 100 and the controller 225 of the smartphone 200 are made up of a CPU, MPU, FPGA, DSP, ASIC, or the like.

As described above, the embodiments have been described as exemplification of the techniques in the present disclosure. For this purpose, the accompanying drawings and detailed description have been provided.

Therefore, the constituent elements described in the accompanying drawings and detailed description may include not only the constituent elements essential for solving the problem but also the constituent elements not essential for solving the problem, for exemplification of the techniques. Thus, these non-essential elements should not immediately be recognized as being essential because these non-essential elements are described in the accompanying drawings and detailed description.

The embodiments are for the purpose of exemplification of the techniques in the present disclosure and therefore can be subjected to various modifications, replacements, additions, and omissions within the scope of claims or the scope equivalent thereto.

INDUSTRIAL APPLICABILITY

The technical concept of the present disclosure is not limited to the implementation in digital cameras and smartphones. Therefore, the technical concept of the present disclosure can be applied to an electronic device capable of communicating with another device to communicate an image.

The invention claimed is:

1. An electronic device capable of communicating with another electronic device and permitting remote control from the other device, comprising:
   a first communicating unit configured to wirelessly communicate with the other electronic device; and
   a controller configured to establish wireless communication with the other electronic device through the first communicating unit by using setting information, wherein
   the controller
      permits the other electronic device to remotely control the operation of the electronic device within a first range, when the setting information used for establishing the communication is information not-temporarily issued, permits the other electronic device to remotely control the operation of the electronic device within a second range which is limited as compared to the first range, when the setting information used for establishing the communication is information temporarily issued.

2. The electronic device according to claim 1, wherein the setting information is issued by the controller to the other electronic device for establishing communication with the other electronic device.

3. The electronic device according to claim 2, further comprising a second communicating unit having a communication distance shorter than wireless communication by the first communicating unit, wherein the controller transmits the setting information through the second communicating unit to the other electronic device.

4. The electronic device according to claim 3, wherein when the other electronic device is identified through the second communicating unit, the controller transmits the setting information to the other electronic device based on user's instruction.

5. The electronic device according to claim 3, wherein when the other electronic device is identified through the second communicating unit, the controller sets the setting information in accordance with an operation mode set in the electronic device and transmits the setting information to the other electronic device.

6. The electronic device according to claim 1, further comprising a displaying unit,
an imaging unit configure to capture an object to generate image data, and
a recording unit recording the image data generated by the imaging unit into a recording medium, wherein the operation within the first range and the operation of the second range are operations related to display of an image on the displaying unit based on the image data recorded in the recording medium.

7. The electronic device according to claim 6, wherein the first range includes an operation when a plurality of images is displayed on the displaying unit and an operation when only one image is displayed on the displaying unit, and the second range includes only an operation when only one image is displayed on the displaying unit.

8. The electronic device according to claim 1, wherein the setting information includes information for identifying the other electronic device.

9. A method of communication between devices for enabling remote control of one electronic device from another electronic device, comprising:

establishing wireless communication between the one electronic device and the other electronic device by using setting information; and controlling whether remote control of the one electronic device from the other electronic device is available based on the setting information used for establishing the communication, wherein the controlling whether the remote control is available includes permitting the other electronic device to remotely control the operation of the one electronic device within a first range, when the setting information used for establishing the communication is information non-temporarily issued, and permitting the other electronic device to remotely control the operation of the one electronic device within a second range limited as compared to the first range, when the setting information used for establishing the communication is information temporarily issued.

* * * * *